(No Model.)

J. C. GUNN.
DUMPING CART.

No. 395,439. Patented Jan. 1, 1889.

WITNESSES
Geo. Y. Thorpe
R. W. Bishop.

INVENTOR.
J. C. Gunn.
by C. A. Crocker
Attorneys.

UNITED STATES PATENT OFFICE.

JOHN C. GUNN, OF KNOXVILLE, TENNESSEE, ASSIGNOR OF ONE-HALF TO CLAUDE E. PRESCOTT, OF SAME PLACE.

DUMPING-CART.

SPECIFICATION forming part of Letters Patent No. 395,439, dated January 1, 1889.

Application filed June 9, 1888. Serial No. 276,565. (No model.)

*To all whom it may concern:*

Be it known that I, JOHN C. GUNN, a citizen of the United States, residing at Knoxville, in the county of Knox and State of Tennessee, have invented a new and useful Improvement in Dumping-Carts, &c., of which the following is a specification.

My invention relates to improvements in dumping-carts, scrapers, and similar vehicles; and it consists in certain novel features, hereinafter described and claimed.

Figure 1:
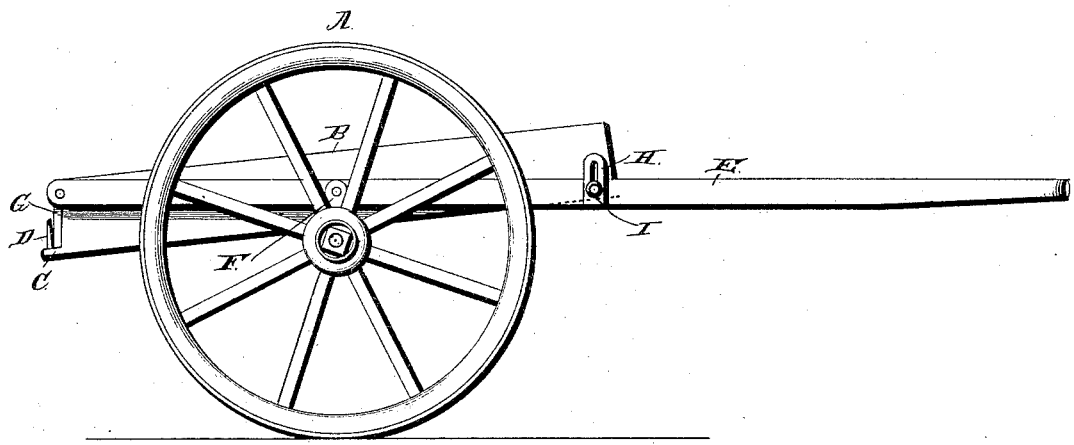
Figure 2:
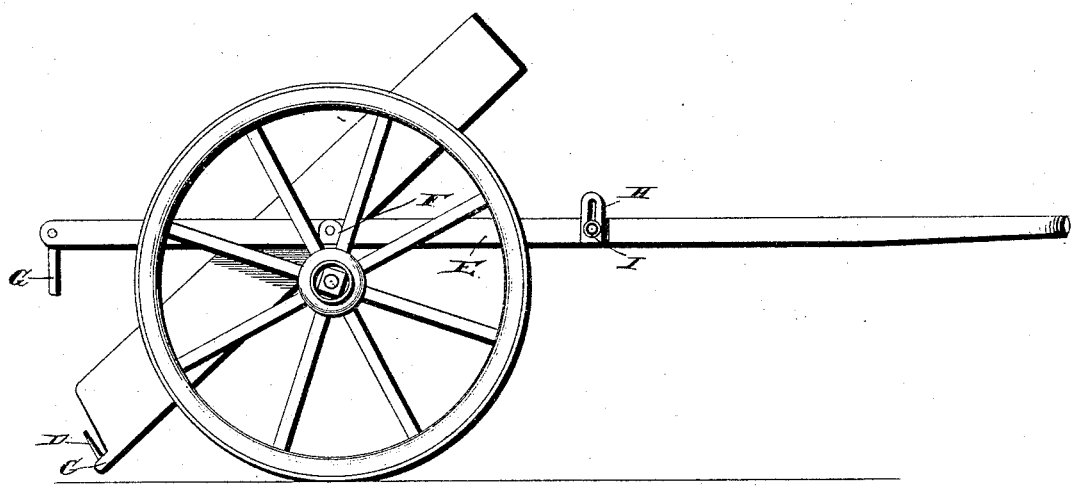

In the accompanying drawings, Figure 1 is a side elevation showing the cart in its normal position, and Fig. 2 is a similar view showing the cart in its dumped position.

Referring to the drawings by letter, A designates the supporting-wheels, and B the body, of the cart supported thereby in the usual manner. The body B is provided at its rear end with the rearwardly-projecting shoulders C and the vertical pins D, secured in and projecting upward from said shoulders a slight distance from the rear ends of the sides of the cart.

E E designate the shafts, which are connected to the axle of the supporting-wheels by brackets F, as shown. The shafts extend to about the rear end of the body of the cart, and the end-gate G is rigidly secured to and between the rear ends of the shafts. The shafts are provided also with the vertical slotted plates H, through which are inserted bolts I, to secure the body in its normal position to the shafts, as shown in Fig. 1.

When in the position shown in Fig. 1, the end-gate rests on the shoulders C in front of the pins D. When it is desired to dump the cart, the front end of the body is released from the shafts, and the body is then dumped in the usual manner. It will be observed that the body dumps away from the end-gate, thus effecting a saving of time in dumping, and also preventing the loss of the end-gate, as it is always in position to pass into its proper place on the return of the body to its normal position.

Having thus described my invention, what I claim, and desire to secure by Letters Patent, is—

The combination of the carrying-wheels, the shafts, the brackets securing the shafts to the axle, the end-gate secured rigidly to the rear ends of the shafts, the body supported on the axle and provided at its rear end with the rearwardly-projecting shoulders C, adapted to receive and support the end-gate, and the pins D, projecting upward from the shoulders C in rear of the end-gate, as set forth.

In testimony that I claim the foregoing as my own I have hereto affixed my signature in presence of two witnesses.

JOHN C. GUNN.

Witnesses:
 GEO. HEAVEN,
 J. Q. CASSADY.